United States Patent Office 3,657,398
Patented Apr. 18, 1972

3,657,398
PROCESS FOR THE PRODUCTION OF HALOGENATED ESTERS OF THE PHOSPHORIC ACID
Roshdy Ismail, Spich, Germany, assignor to Dynamit Nobel Aktiengesellschaft, Troisdorf, Germany
No Drawing. Filed Mar. 13, 1969, Ser. No. 811,277
Claims priority, application Germany, Mar. 16, 1968, P 16 68 889.4
Int. Cl. C07f 9/12, 9/14
U.S. Cl. 260—973     14 Claims

ABSTRACT OF THE DISCLOSURE

Improvements in the reaction of halogenated phenols with phosphorus acid chlorides using as the catalyst compounds of elements of Group V–A of the Periodic System, preferably compounds of nitrogen, phosphorus, arsenic or antimony.

---

Objects of the invention is a process for the production of halogenated esters of the phosphoric acid of the general formula

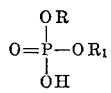

in which R and $R_1$ can be the same or different radicals and which signify halogenated phenyl radicals or at the same time halogenated diphenylalkane- or diphenyl radicals, which in a given case may be substituted on the aliphatic constituent.

A process for the production of such halogenated esters of the phosphoric acid is already well known. By this process, for example, $POCl_3$ and pentachlorophenol in the mol ratio 1:2 are reacted to form di-(pentachlorophenyl)-monochlorophosphate. Subsequently, this compound is boiled in an aqueous solution of caustic soda and converted into the sodium salt of the di-(pentachlorophenyl)-phosphate, under hydrolytic separation of the chlorine atom located at the phosphorus atom.

When treating with diluted HCl, the desired halogenated ester of the phosphoric acid can be produced therefrom. However, the thusly obtained product is very impure. It particularly contains considerable amounts of tri-(pentachlorophenyl)-phosphate. In addition, this known process is cumbersome and not economical.

It has now been found that one can very easily obtain phosphoric acid esters containing chlorine of the general formula

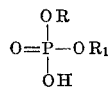

where the R groups are as set forth above, if one condenses, at a temperature of 50 to 220° C., preferably 60 to 180°, possibly if necessary in the presence of inert solvents, halogenated phenols with acid chlorides of the phosphorus of the general formula

in which R' signifies a methyl-, ethyl-, or propyl group, in the presence of catalytic amounts of compounds of the elements of the V–A Group of the Periodic System, preferably of nitrogen, phosphorus, arsenic and antimony, having bonds to organic radicals, whereby these compounds may be also heterocyclic compounds of nitrogen.

There can also be used to effect such condensing salts, preferably hydrochlorides of these Group V–A compounds.

The conversion in accordance with the above invention is preferably carried out at normal pressure; however, a higher pressure up to about 12 atmospheres above atmospheric pressure can be used which, however does not have appreciable advantages in comparison to the procedure without pressure.

This reaction can be carried out in the molten state as well as in the presence of inert solvents.

Suitable inert solvents in the sense of the instant invention are aliphatic as well as aromatic hydrocarbons as well as simple and cyclic ethers. As aliphatic hydrocarbons there can be mentioned specific compounds as well as mixtures thereof, such as isooctane and gasoline fractions, for example, gasoline fractions with a boiling range of 120–180° C. Benzene, nitrobenzene, toluene and xylene are examples for suitable aromatic hydrocarbons.

The following are ethers which are suited to carrying out the reaction: di-isopropyl ether, diisoamylether, diphenyl ether, ¼ dioxane, and others. The above illustration of suitable ethers show that aliphatic aromatic as well as cyclic ethers can be used.

Monovalent, or alkyl-substituted, halogenated phenols of the formula

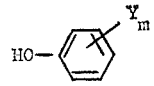

in which Y signifies a halogen and m a whole number of 3 to 5, are suited as starting reactants for carrying out the process in accordance with the invention.

Suitable monovalent phenols are, for example, the fluorinated phenols, like pentafluorophenol, the chlorinated phenols, such as 2,3-, 2,4-, 2,5-, 2,6-, 3,4-, 3,5-dichlorophenol, 2,4-dichloro-6-methylphenol, 2,6-dichloro-4-tert. butylphenol, 2,3,5-, 2,4,6-trichlorophenol, 2,3,4,6-tetrachlorophenol as well as pentachlorophenol, the brominated phenols, such as 2,4-, 2,6-dibromophenol, 2,4,6-tribromophenol and pentabromophenol, and the iodated phenols, such as2,4 -, 2,6-di-iodophenol and 2,4,6-tri-iodo phenol. Of course, also the mixtures of the above-mentioned halogenated phenols can be used for the conversion according to the invention.

It is also within the purview of this invention to use bivalent, halogenated phenols which may also have a suitable alkylene bridge of the formula

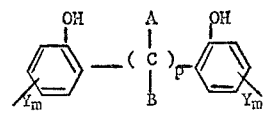

in which A and B are the same or different, and signify hydrogen or an alkyl group with 1 to 4 C-atoms or a cycloalkyl group of about 4 to 8 carbon atoms, and in which p equals 0 or 1 and Y and m are as set forth above. Examples for such bivalent phenols are 2,2'-methylene-bis-(3,4,6 - trichlorophenol), 2,2' - propylene-bis-(3,4,6-trichlorophenol) and similar substances.

The following substances can be used in accordance with the invention as phosphorus acid chlorides of the general formula

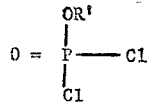

in which R' signifies a methyl-, ethyl- or propyl group, methylphosphoryldichloride, (methyldichlorophosphate), ethylphosphoryldichloride (ethyldichlorophosphate), isopropylphosphoryldichloride (isopropyldichlorophosphate) and n-propylphosphoryldichloride (n-propyldichlorophosphate). Phosphorus acid chlorides of the last mentioned formula with more than three carbon atoms in R' are not suited as starting substances for the process according to the invention.

For the production of halogenated esters of phosphoric acid, phosphorus acid chlorides and halogenated phenols can be used in stochiometric ratios, such that 1 mol of halogenated phenol is used per mol of phosphorus acid chloride. The yields of halogenated esters of phosphoric acid can be improved by using an excess of phenolic reactant compounds.

Typical compounds of the elements of the V–A-group of the Periodic System which are suited for carrying out the process according to the invention, are specific and mixed tert. amines having aliphatic, cycloaliphatic and aromatic substituents. Imines are to be included within the amines of the instant invention and shall be understood as a kind of cyclic, tertiary amines. For example, suitable tertiary amines with aliphatic substituents are: trimethylamine, triethylamine, triisopropyl amine, triisobutyl amine, monoethyldiisopropyl amine, monoethyl-di-n-butyl amine, tri-n-butyl amine, N,N,N',N' - tetramethyl - butadiamine-(1,4),N,N,N',N'-tetramethylethylene diamine, or substituted, tertiary, aliphatic amines, such as ($\beta$-chloropropyl)dipropylamine, tri-($\beta$-ethoxyethyl)-amine, methylaminoacetonitrile, N,N-di-n-butylaminoacetonitrile, N,N-diisopropylaminoacetonitrile, N - n-butyl-N-methylaminoacetonitrile, methyleneaminoacetonitrile, N,N-diisobutylaminopropionitrile, $\beta$ - dimethylaminopropionitrile, dimethylaminoacetonitrile, di-methyl-p-aminobenzenenitrile. Dimethylcyclohexylamine can be mentioned as an example of cyclic aliphatic amines. Furthermore, suitable amines with aromatic substituents can be named, such as N,N-dialkylanilines, e.g. N,N-dimethylaniline, N,N-diethylaniline, and the like, p-bromophenyldimethylamine, 2,4-dinitrophenyldimethylamine, benzenedimethylamine, p-nitrophenyl-di-n-butylamine, N - (2,4-dichlorophenyl-)diethylamine, N,N,N',N'-tetramethylbenzidine and the like. Suitable heterocyclic, tertiary amines are for instance: N-alkyl, or N-aryl-morpholines, such as N-n-butylmorpholine, N - phenyl morpholine, N - (p - methylphenyl-) morpholine, morpholino acetic acid morpholide, N-aryl- or N-alkyl-tetrahydroquinoline, or -tetrahydroisoquinoline, such as N-n-propyltetrahydroquinoline, N-phenyl-tetrahydroisoquinoline, for example N-alkyl- and N-aryl-pyrrolidines and their derivatives, for example N-methylpyrrolidine, N-n-butylpyrrolodine, N-phenylpyrrolidine, and the like. Aromatic tertiary amines are also exampified by pyridine, isoquinoline, pyrazine, oxazine, quinazoline, oxazole, oxdiazole, benzthiazol, and the like. Particularly tertiary amines containing nitrile groups have proven to be suitable for carrying out the process in accordance with the instant invention. Mixtures of these amines are also suitable as catalysts for this reaction.

The HCl partial vapor pressure of the aminehydrochloride at the reaction temperature has proven itself as a measure of the suitability of a tertiary amine, that is the HCl partial vapor pressure of the hydrochloride has to be lower than the reaction pressure. At normal pressure, therefore, those amines are useful which have an HCl partial vapor pressure which within the temperature range of the process is less than 760 mm. Hg. At normal pressure, preferably such amines are used which have HCl partial vapor pressures, at 50 to 180°, of within the range of about 80–700 mm. Hg this means that the hydrochlorides of the tertiary amines used in accordance with the invention are thermally unstable in the reaction temperature range, but are still in a formation-decomposition equilibrium.

Further, compounds of the elements of the V–A-group of the Periodic System which are suitable as catalysts for the condensation of this invention are the following types of onium compounds and phosphorus- or antimony-hydrogen derivatives: triphenylmethyl phosphonium iodide, triphenylbenzyl phosphonium chloride, p - xylylene - bis-(triphenyl phosphoniumchloride), p-xylylene-bis(triethylphosphoniumbromide) tetraethylphosphoniumbromide, triethyloctadecylphosphonium iodide, Bis(triethylphosphoniumacetal) - 1,4 - butane, triphenylmethylarsonium iodide, triphenylmethylarsonium hydroxide, triphenylethylarsonium iodide, triphenylhydroxyethylarsoniumchloride, tributylphosphine, triphenylphosphine, tributylstibine, triphenylstibine.

The compounds or their salts used as catalysts are employed in amounts of 0.1–10 mol percent, preferably 0.1–5 mol percent, based on the amount of phosphorus acid chloride.

Under the conditions in accordance with the invention, the condensation proceeds rapidly and with separation of stoichiometric amounts of gaseous HCl. In this manner, easily isolatable halogenated esters of the pyrophosphorus acid are produced in good yield and of high purity.

The formation of phosphorus acid esters under the reaction conditions in accordance with the invention could by no means be predicted. On the contrary, it was rather to be expected that there would be formed halogenated phosphorus acid esters of the formula

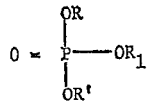

in which R and $R_1$ have the aforementioned meaning.

As could be established, these compounds are, however, only formed in a first stage. Thereafter or already during this primary condensation, a separation of R'Cl occurs. This reaction sequence and thus the formation of such halogenated esters of phosphoric acid in accordance with the process of the invention was surprising.

A further aspect of the invention resides in the halogenated esters of the phosphoric acid prepared in accordance with the above described process of the invention which have the general formula

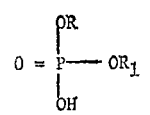

in which R and $R_1$ have the aforementioned meaning.

The halogenated esters of the phosphoric acid in accordance with the invention are usable as insecticides, acaricides, pesticides, and bacteriacidal agents. Furthermore, they are usable as difficultly combustibly dielectrics and flame-inhibiting substances for synthetic plastics, as additions to lacquers and as impregnating agents for textiles.

This invention may be illustrated by the following non-limiting examples:

EXAMPLE 1

Di-(pentachlorophenyl)-phosphate was synthesized in the following manner. In a 500 ml. three-neck flask, provided with stirrer, cooler, and inlet tube for $N_2$, there are placed 250 ml. gasoline (115–140° C.) and 0.4 ml. N,N-diisobutylamine-acetonitrile. There are added 16.3 g. ethylphosphoryldichloride (0.1 mol), with 53.3 g. pentachlorophenol (0.2 mol) as reactants. The resulting HCl gas was washed out from the boiling reaction mixture with $N_2$ and then trapped in NaOH solution. The reaction was ended after 20 hours. The separated precipitate of di-(pentachlorophenyl)phosphate was filtered off, dried. Yield 83%, melting point 290–291° C. The OH group of the phosphoric acid ester was established through nuclear resonance measurement.

The same reaction carried out without catalyst, showed that not 10% of the theoretical amount of HCl was separated after 24 hours of reaction of the boiling point of the xylene.

EXAMPLE 2

Di-(2,4,6-trichlorophenyl)-phosphate was produced as follows. In a 500 ml. three-neck flask provided with stirrer, cooler and inlet tube for N₂, there were reacted 16.3 g. ethylphosphoryldichloride (0.1 mol) with 39.6 g. trichlorophenol (0.2 mol) in 250 ml. gasoline (B.P. 115–140° C.) and in the presence of 0.4 ml. N-methylpyrrolidine. The resulting HCl gas was washed out with N₂ from the boiling reaction mixture and trapped in NaOH solution. The reaction was finished after 5 hours. The precipitating di(2,4,6-trichlorophenyl)-phosphate was filtered off and dried. Melting point 212–214° C., yield about 80%.

EXAMPLE 3

In a three-neck flask, provided with stirrer, cooler and inlet tube for N₂, there were reacted 16.3 g. ethylphosphoryldichloride (0.1 mol) with 66.2 g. 2,4,6-tribromophenol (0.2 mol) in 250 ml. gasoline (115–140° C.) and in the presence of 0.4 ml. N-N-dibutyl-aminoacetonitrile. The resulting HCl gas was washed out with N₂ from the boiling reaction mixture and trapped in NaOH solution.

After 24 hours the precipitate was filtered off and dried. Melting point 235–238° C., yield about 80%. The analysis showed that it was di(tribromophenyl)-phosphate.

By nuclear resonance measurements, the OH group of the reaction product was proven.

EXAMPLE 4

Di - (pentachlorophenyl) - phosphate was produced in accordance with Example 1, except that 0.5 g. morpholine acetic acid morpholide was used as catalyst instead of N,N-diisobutylaminoacetonitrile. The precipitated product had a melting point of 290° C. Yield 80%.

EXAMPLE 5

Di(trichlorophenyl)-phosphate was prepared in accordance with Example 2, except that 0.5 g. N,N,N',N'-tetramethylbenzidine was used as catalyst instead of N-methylpyrrolidine. The separated precipitate had a melting point of 231° C. and a yield of about 80%.

EXAMPLE 6

Di(tribromophenyl)-phosphate was prepared in accordance with Example 3, except that 0.5 ml. N-methylpyrrolidine was used as catalyst instead of N,N-dibutyl-aminoacetonitrile. The separated precipitate had a melting point of 236° C. and a yield of 80%.

What is claimed is:

1. Method of producing halogenated esters of phosphoric acid of the formula

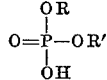

wherein R and R₁ are each a member selected from the group consisting of halogenated phenyl-containing substituents, which process comprises reacting in the liquid phase a halogenated phenol with a phosphorus acid chloride of the general formula

wherein R' is a member selected from the group consisting of methyl, ethyl, and propyl, at about 50 to 200° C. in the presence of a catalytic amount of at least one organic compound of an element of Group V–A of the Periodic System.

2. Process as claimed in claim 1, carried out at about 60 to 180° C.

3. Process as claimed in claim 1, wherein said Group V–A element is at least one member selected from the group consisting of nitrogen, phosphorus, antimony and arsenic.

4. Process as claimed in claim 1, wherein said Group V–A element is nitrogen and said compound catalyst is at least one member selected from the group consisting of aliphatic, cycloaliphatic and aromatic amines.

5. Process as claimed in claim 4, wherein said amine is an ammonium hydrochloride.

6. Process as claimed in claim 1, wherein said halogenated phenol is at least one member selected from the group consisting of

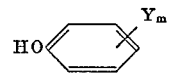

and

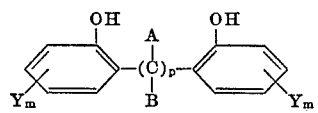

wherein Y is a halogen, m is a whole number from 3 to 5, A and B are each at least one member selected from the group consisting of hydrogen, cycloalkyl having 4 to 8 carbon atoms and an alkyl group, and wherein p is from 0 to 1.

7. Process as claimed in claim 1, carried out in a substantially inert solvent.

8. Process as claimed in claim 1, carried out in the melt.

9. Process as claimed in claim 7, wherein said solvent is at least one member selected from the group consisting of isooctane, benzine fractions, benzene, nitrobenzene, toluene, xylene, diisopropyl ether, diisoamyl ether, diphenyl ether and 1,4-dioxane.

10. Process as claimed in claim 1, wherein said halogenated phenol is at least one member selected from the group consisting of pentafluorophenol, pentachlorophenol, 2,3-dichlorophenol, 2,4-dichlorophenol, 2,5-dichlorophenol, 2,6-dichlorophenol, 3,4-dichlorophenol, 3,5-dichlorophenol, 2,4-dichloro-6-methylphenol, 2,6-dichloro-4-tertiary butylphenol, 2,3,5-trichlorophenol, 2,4,5-trichlorophenol, 2,4,6-trichlorophenol, 2,3,4,6-tetrachlorophenol, 2,4-dibromophenol, 2,6-dibromophenol, 2,4,6-tribromophenol, pentaiodophenol, 2,4,6-triiodophenol, 2,4-diiodophenol, 2,6-diiodophenol, 2,2'-methylene-bis-(3,4,6-trichlorophenol), and 2,2'-propylene-bis-(3,4,6-trichlorophenol).

11. Process as claimed in claim 1, wherein said phosphorus acid chloride is at least one member selected from the group consisting of methyl-dichlorophosphoric acid, ethyl - dichlorophosphoric acid, isopropyl - dichlorophosphoric acid, and n-propyl-dichlorophosphoric acid.

12. Process as claimed in claim 1, wherein said catalyst is at least one member selected from the group consisting of trimethylamine, triethylamine, triisopropylamine, triisobutylamine, monoethyl-diisopropylamine, monoethyl-di-n-butylamine, tri-n-butylamine, N,N,N',N'-tetramethyl-butanediamine-(1,4), N,N,N',N'-tetramethyl - ethylenediamine, (β-chloropropyl)-dipropylamine, tri-(β-ethoxyethyl)-amine, methylaminoacetonitrile, N,N-di-n-butylaminoacetonitrile, N,N-diisopropylaminoacetonitrile, N-n-butyl-N-methylaminoacetonitrile, methylene-aminoacetylene-nitrile, N,N-diisobutyl-aminopropionitrile, β-dimethylaminopropionitrile, dimethyl-aminoacetonitrile, dimethyl-p-aminobenzonitrile, dimethylcyclohexylamine, N,N-dimethylaniline, N,N-diethylaniline, p - bromophenyl - dimethylamine, 2,4-dinitrophenyl-dimethylamine, benzyldimethylamine, p-nitrophenyl-di-n-butylamine, N-(2,4 - dichlorophenyl) - diethylamine, N,N,N',N' - tetramethylbenzidine, N-n-butyl-morpholine, N-phenyl-morpholine, N-(p-methylphenyl)-morpholine, morpholinoacetic acid-morpholide, tetrahydroisoquinoline, N - n - propyltetrahydroquinoline, N-phenyl - tetrahydroisoquinoline, N - methylpyrrolidine, N-n-butylpyrrolidine, N-phenylpyrrolidine, pyridine, isoquinoline, pyrazine, oxazine, quinazoline, oxazole, oxadiazole, benzothiazole, triphenylmethyl phosphonium iodide, triphenylbenzyl phosphonium chloride, p-xylylene-bis-(triphenyl phosphoniumchloride), p-xylylene-bis(triethylphosphonium bromide), tetraethylphosphoniumbromide, triethyloctadecylphosphonium iodide, bis-(triethylphosphoniumacetal)-1,4-butane, triphenylmethylarsonium iodide, triphenylmethylarsonium hydroxide, triphenylethylarsonium iodide, triphenylhydroxyethyl-arsoniumchloride, tributylphosphine, triphenylphosphine, tributylstibine, and triphenylstibine.

13. Process as claimed in claim 12, wherein said amine in the hydrochloride form has a partial vapor pressure less than the atmospheric pressure at the temperature at which the reaction is carried out.

14. Process as claimed in claim 13, wherein said partial vapor pressure is about 80 to 700 mm. Hg when said process is carried out at atmospheric pressure.

References Cited

UNITED STATES PATENTS 2,710,269    6/1955    Higgins et al. _____ 260—965 X

OTHER REFERENCES

Houben-Weyl, Methoden der Organischen Chemie, XII/2, pp. 243, 262 to 264 and 325 (1964).

JOSEPH REBOLD, Primary Examiner

R. L. RAYMOND, Assistant Examiner

U.S. Cl. X.R.

260—953, 955, 964, 965, 983, 999

PO-1050
(5/69)

UNITED STATES PATENT OFFICE
CERTIFICATE OF CORRECTION

Patent No. 3,657,398      Dated April 18, 1972

Inventor(s) Roshdy Ismail

It is certified that error appears in the above-identified patent and that said Letters Patent are hereby corrected as shown below:

Column 2, line 22, "1/4" should read --1,4--

Column 2, line 38, after "2,3,5" insert - --2,4,5--

Column 4, line 30, "R and $R_1$" should read --R', R and $R_1$--

Signed and sealed this 24th day of October 1972.

(SEAL)
Attest:

EDWARD M.FLETCHER,JR.　　　　　　　　　ROBERT GOTTSCHALK
Attesting Officer　　　　　　　　　　　　Commissioner of Patents